United States Patent [19]

Chang et al.

[11] Patent Number: 5,737,249
[45] Date of Patent: Apr. 7, 1998

[54] ACTIVE SONAR RANGE-BEAM PARTITIONER

[75] Inventors: Weita Chang, Niantic; John H. Geary, Ledyard, both of Conn.

[73] Assignee: The United States of America as represented by the Secretary of the Navy, Washington, D.C.

[21] Appl. No.: 789,454

[22] Filed: Jan. 27, 1997

[51] Int. Cl.$^6$ ..................................................... H03H 25/00
[52] U.S. Cl. ............................................. 364/572; 367/87
[58] Field of Search .................................. 364/572, 574; 395/20, 21, 22, 23; 367/87–105, 138, 131, 135, 118–127

[56] References Cited

U.S. PATENT DOCUMENTS

| | | | |
|---|---|---|---|
| 4,686,532 | 8/1987 | McAulay | 367/87 |
| 5,315,538 | 5/1994 | Borrell et al. | 364/574 |
| 5,329,495 | 7/1994 | Zehner | 367/138 |
| 5,598,510 | 1/1997 | Castelaz | 395/20 |

*Primary Examiner*—James P. Trammell
*Attorney, Agent, or Firm*—Michael J. McGowan; Prithvi C. Lall; Michael F. Oglo

[57] ABSTRACT

A method and device for enhanced detection of active sonar input signals are provided. The method uses a multi-step manipulation of range-bearing data through lag vectors to map each resolution cell into a feature vector. Feature vectors are used to generate a set number of cluster means. Each feature vector is assigned to a given cluster mean, and the cluster means are used to further partition the input data. To eliminate over-fragmentation, similar clusters are consolidated to provide the correct level of resolution. The device comprises a standard active sonar system having a range-beam partitioner inserted between the initial signal filters and the final two-dimensional adaptive filter of the system. The range-beam partitioner manipulates the input data, forming it into homogeneous partitions according to the method and then provides the enhanced data to the adaptive filter. The use of both the method and device allow for the adaptive filter to more effectively estimate the co-variance structure of the entire range-beam space, eliminating errors from both the consolidation of non-homogeneous regions into single regions and from breaking homogeneous regions into more than a single region.

20 Claims, 3 Drawing Sheets

ACTIVE SONAR RANGE-BEAM PARTITIONER

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

(1) Field of the Invention

The present invention relates generally to sonar systems, and particularly to adaptive filtering and range-bearing matched active sonar systems.

(2) Description of the Prior Art

One of the major challenges throughout the evolution of sonar systems has been that of continuing to improve the detection capability of the system. One effective means of achieving this goal has been to apply a two-dimensional filter to range-beam matched filter output. This method has relied upon estimating the co-variance matrix throughout the range-beam space. However, co-variance structures are not constant throughout the entire range-beam space; thus, one major problem has been developing a good estimate for the co-variance structure used in the two-dimensional filter. In the prior art, two methods have consistently been used.

The first uses a single co-variance estimate for the entire space. This methodology has undesirable results simply due to the variability of the co-variance matrix throughout range-beam space. By using a single co-variance estimate, adaptive filters are unable to adapt to local variations in the received signal.

The second method is to partition the range-beam space randomly or by using some constant method. The weakness of this method is that it does not take the co-variance characteristics of the underlying range-beam space into consideration, and can result in either multiple partitions for a homogeneous region, or, more importantly, the combination of two dissimilar regions into one space. When dissimilar regions are combined as described, the co-variance information does not accurately reflect the characteristics of either of the dissimilar regions.

No prior art methods exist which adaptively segment the matched filter range-beam space into homogeneous regions.

SUMMARY OF THE INVENTION

Accordingly, it is an object of the present invention to provide a method for dynamically segmenting range-beam space into regions, each of which has relatively homogeneous co-variance characteristics.

A further object of the present invention is to use a subset of the available data to provide fast initial estimates of the topology of co-variance space.

A still further object of the present invention is to allow for user-selectable minimum segment sizes, thus preventing overly segmented partition results.

In accordance with these and other objects, the invention is a method and device for improving the performance of a two-dimensional adaptive range-beam filter in an active sonar system. The method disclosed includes (1) generating a reference set of non-redundant difference vectors for the input signal, (2) computing a set of feature vectors for each resolution cell, (3) partitioning the feature vectors into distinct classes, and (4) reclassifying feature vectors such that a user assigned minimum region size is maintained.

The mechanical device has an input signal receptor array which receives an input sonar signal and converts it to an electrical signal using analog to digital converters. The converted electronic signal is next processed by a beam-former which forms time series for the input data. The time series data is passed to a replica correlation matched filter or other pre-filter which further processes the beam formed output, including preforming any downsampling or a base-banding of the signal that is required. The processed signal, which is now an electronic representation of the range-beam space, is passed to a range-bearing partitioner. The range-bearing partitioner handles enhancing the signal by partitioning the input signals into a user-defined number of distinct partitions. In the process of dividing the signal into these partitions, each resolution cell is examined and classified according to its co-variance characteristics in relation to the rest of the range-bearing space. The output of the partitioner, which represents a class membership for each resolution cell, together with the enhanced co-variance estimates of each region, is next passed into a two dimensional adaptive filter. Because the partitioner has divided range-beam space into regions having homogeneous co-variance characteristics, the performance of the two-dimensional filter is greatly enhanced.

BRIEF DESCRIPTION OF THE DRAWINGS

The foregoing objects and other advantages of the present invention will be more fully understood from the following detailed description and reference to the appended drawings wherein.

DESCRIPTION OF THE PREFERRED EMBODIMENTS

Figure 1:
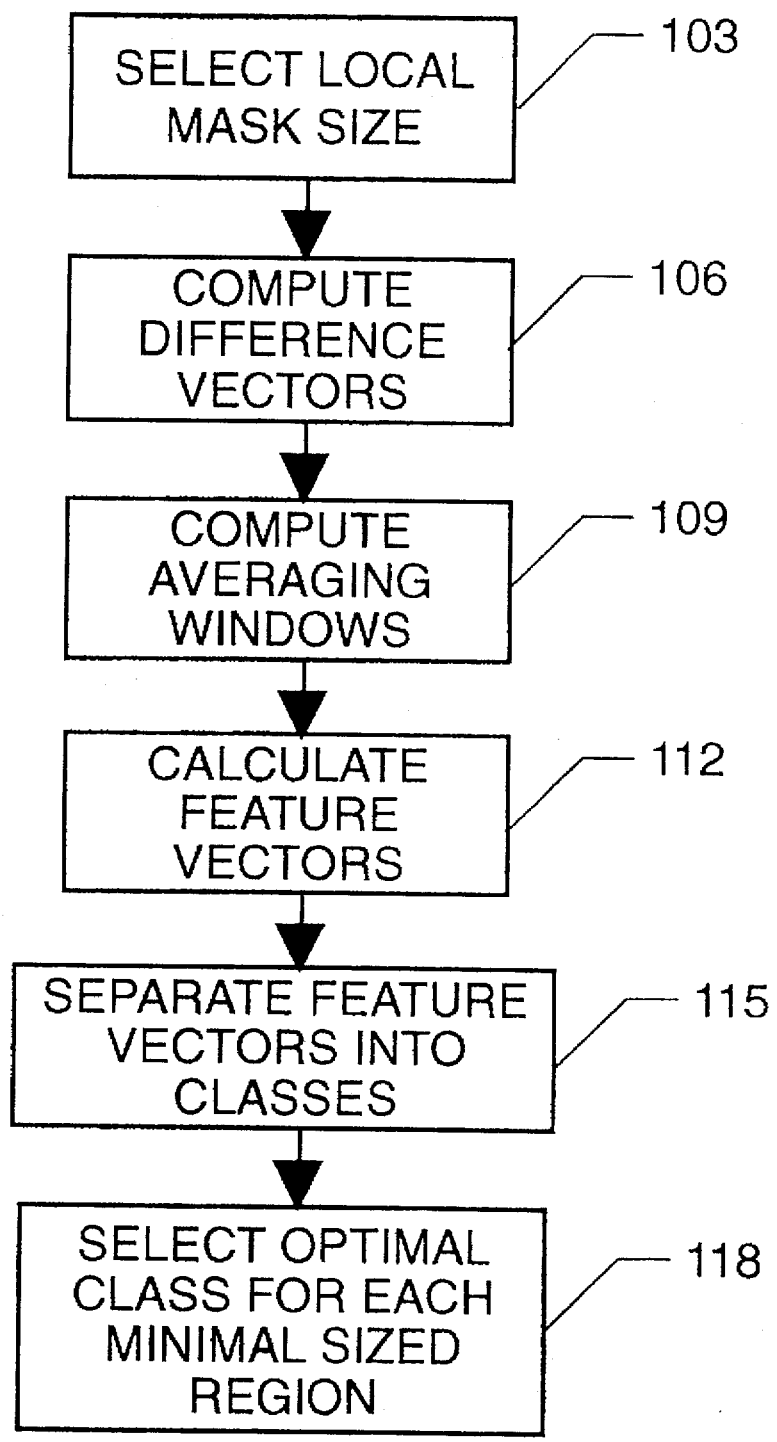
FIG. 1 is a flow chart of the method for partitioning the active sonar input into homogeneous regions.

Referring now to the drawings, and in particular to FIG. 1, a flow chart of the steps involved in the method for enhancing the performance of a two-dimensional adaptive filter is presented. The method takes, as its input, a vector of time series data representing the sonar data received by an active sonar array. Generally, this information is provided by an active sonar array, beamformer, and pre-filters. In step 103, the user first selects a local mask size. The local mask size determines the quantity of lag vectors which must be computed thus, for very large values for the local mask size, the computational power required for real-time processing can be substantial. The local size must be chosen to be large enough to capture the difference of co-variance characteristics of homogeneous regions. The local mask values will be referred to as m (the range local mask) and n (the bearing local mask) in this disclosure. In the applications treated in the past, good results for both method robustness and relative resolution have been achieved by setting the local mask size values for m and n ranges between three and eleven. Once the local mask size has been set in step 103, a reference set of difference vectors is computed in step 106. These difference vectors can be thought of as the set of the different horizontal, vertical, and diagonal lag vectors available from the local mask. Specifically, the set of difference vectors is defined as $(d_1, d_2)$ where $d_1$ and $d_2$ are selected through two systems. In the first system, $d_1$ varies from 0 to $m-1$ while $d_2$ is set to 0. This results in m vectors. In the second set, $d_1$ varies with a unit increment from $1-m$ to $m-1$ while $d_2$ varies from 1 to $n-1$. This results in $2m-1$ values for $d_1$ and n values for $d_2$. These two methods generate a total of $2mn-n-m+1$ distinct difference vectors.

Once the complete set of difference vectors is computed in step 106, an averaging window must be computed for each cell of the input resolution matrix in step 109. In order to compute the averaging window, the user specifies the desired window size M (range) and N (beam). Both of these parameters must be odd so that they include the base cell plus an even number of cells in each direction. The averaging window is then computed as the subset of the input resolution matrix equal to one half the two window sizes in each direction. For instance, for the resolution cell (i,j), the averaging window would include the subsection of the input resolution matrix bounded by the four corners designated $(i-(M-1)/2, j-(N-1)/2)$, $(i+(M-1)/2, j-(N-1)/2)$, $(i+(M-1)/2, j+(N-1)/2)$ and $(i-(M-1)/2, j+(N-1)/2)$.

The difference vectors in step 106 and the averaging windows in step 109 are directly used in step 112 when the feature vectors for the input resolution matrix are calculated. The said feature vectors are $(2mn-n-m+1)$-dimensional. Each coordinate of a feature vector corresponds to the co-variance corresponding to a lag vector mentioned above. If the k-th coordinate corresponds to the lag vector $(d_1,d_2)$ we write $k(d_1,d_2)$ to emphasize this fact. The feature vectors are a direct mapping of the difference vectors as follows mathematically:

$$f(k(d_1,d_2)) = \frac{1}{|S|} \sum_{(i,j) \in S} x(i,j) x(i+d_1, j+d_2)$$

S is the set of all cell locations such that both (i,j) and $(i+d_1, j+d_2)$ belong to the averaging window computed in step 109. Additionally, one final point is added to the feature vector, $(w \times i_o, w \times j_o)$, where w is a user defined weighing factor.

Once the computation of the feature vectors are completed in step 112, the feature vectors are separated into distinct, relatively homogeneous clusters in step 115. In order to perform this clustering function, the user must specify several parameters: the number of distinct clusters which the method should generate ($k_c$), the number of updates ($k_{iter}$), and a specification of whether the initial cluster mean vectors are provided or should be generated randomly ($i_{ran}$). When $i_{ran}$ is set to specify that an initial set of cluster mean vectors will be provided, these vectors must additionally be furnished to the method. The cluster mean vectors are denoted $M_x(y)$ where x is an integer reference which relates the cluster vector to the correspondingly labeled feature vector and y is an integer value specifying the update number of the cluster mean vector.

If $i_{ran}$ is not set (specifying that the initial cluster mean vectors should be set randomly), then each cluster mean vector $M_x(0)$ (where x varies from 0 to $k_c-1$) is set to a random value in the range of the feature vector values. If $i_{ran}$ was set, then the initial vectors are not modified in this substep.

Next, the mean cluster values are iteratively updated for $k_{iter}$ iterations. During each iteration, each feature vector is reclassified to the cluster whose mean cluster value is closest to its value. Once all feature vectors have been reclassified, then all mean cluster values are recomputed based on their new feature vector composition. This methodology allows a wide range of feature vectors to be subdivided into several distinct clusters centered around certain mean values.

The cluster identification assigned to each cell of range-beam space during step 115 is used in step 118 to select an optimal cluster for each minimally sized region. In order to do this, range-beam space is first partitioned into blocks representing the minimal region sizes which the user desires. In each of these blocks, all cells within the block are reclassified to the cluster which contains the most members. Because the user is able to specify the minimum region size desired, the user can select the degree of trade-off between homogeneity within the region and fragmentation of the complete range-beam space.

Figure 2:
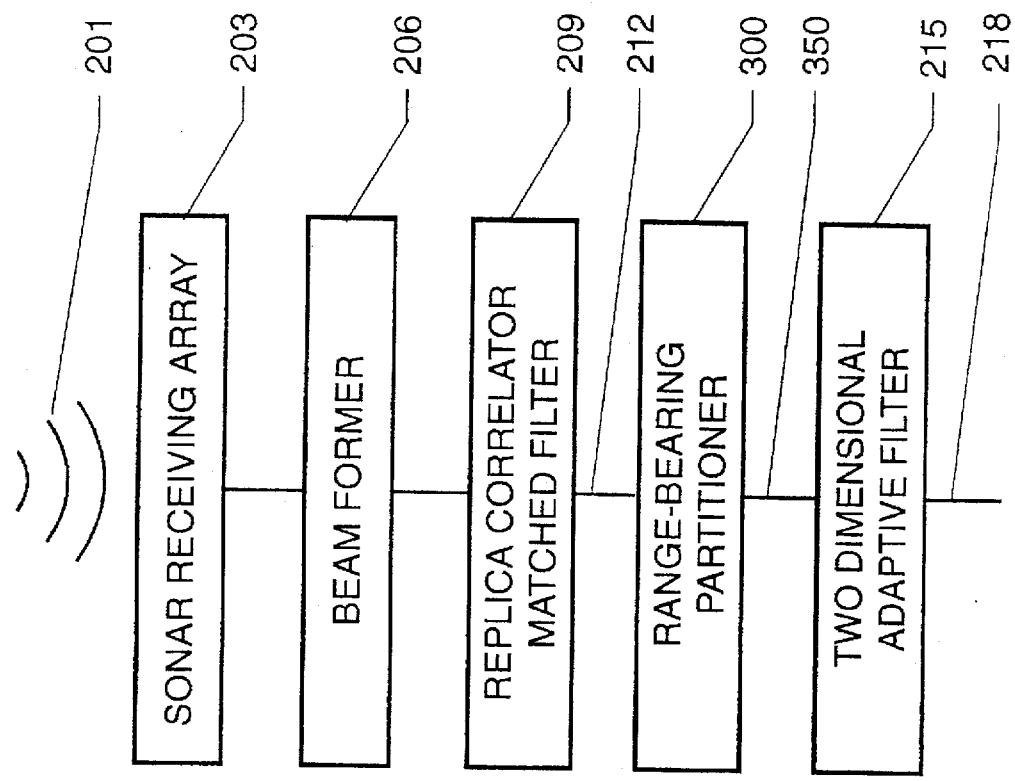
FIG. 2 is a block diagram of the components of the enhanced active sonar device and the signal lines between each component.

Referring now to FIG. 2, a block diagram of the complete active sonar system using the range-beam partitioner enhancement is provided. Incoming signal 201 is first received by sonar receiving array 203. Sonar receiving array 203 converts the sonar pulses into electrical signals through the use of analog-digital converters. The resulting electrical signal is provided from sonar receiving array 203 to beamformer 206. Beamformer 206 forms time series from multiple beams and passes this information to replica-correlator matched filter 209 or similar pre-filters. These types of prefilters in general, and replica-correlator matched filter 209 in particular, provide for downsampling and basebanding and then pass conditioned input signal 212 to range-bearing partitioner 300. Other alternative processing after matched filter and before range-bearing partitioner aside from sampling may also include O-ring and taking absolute or magnitude values. It should be noted that O-ring is a process in which sampling rate is reduced by taking the maximum value of the sample. As an example, 10:1 O-ring means that we take the maximum out of the samples and thus reduce the sampling to 1/10 of the original value. Range-bearing partitioner 300 generates homogeneous partitions from the data in conditioned input signal 212 and outputs enhanced partitioned input signal 350 to two-dimensional adaptive filter 215. Because the input to two-dimensional adaptive filter 215 is much more consistent throughout co-variance space due to the homogeneous nature of the partitions, the output from two-dimensional adaptive filter 215 is much more robust, leading to greater detection thresholds and enhanced reliability and sensitivity.

Figure 3:
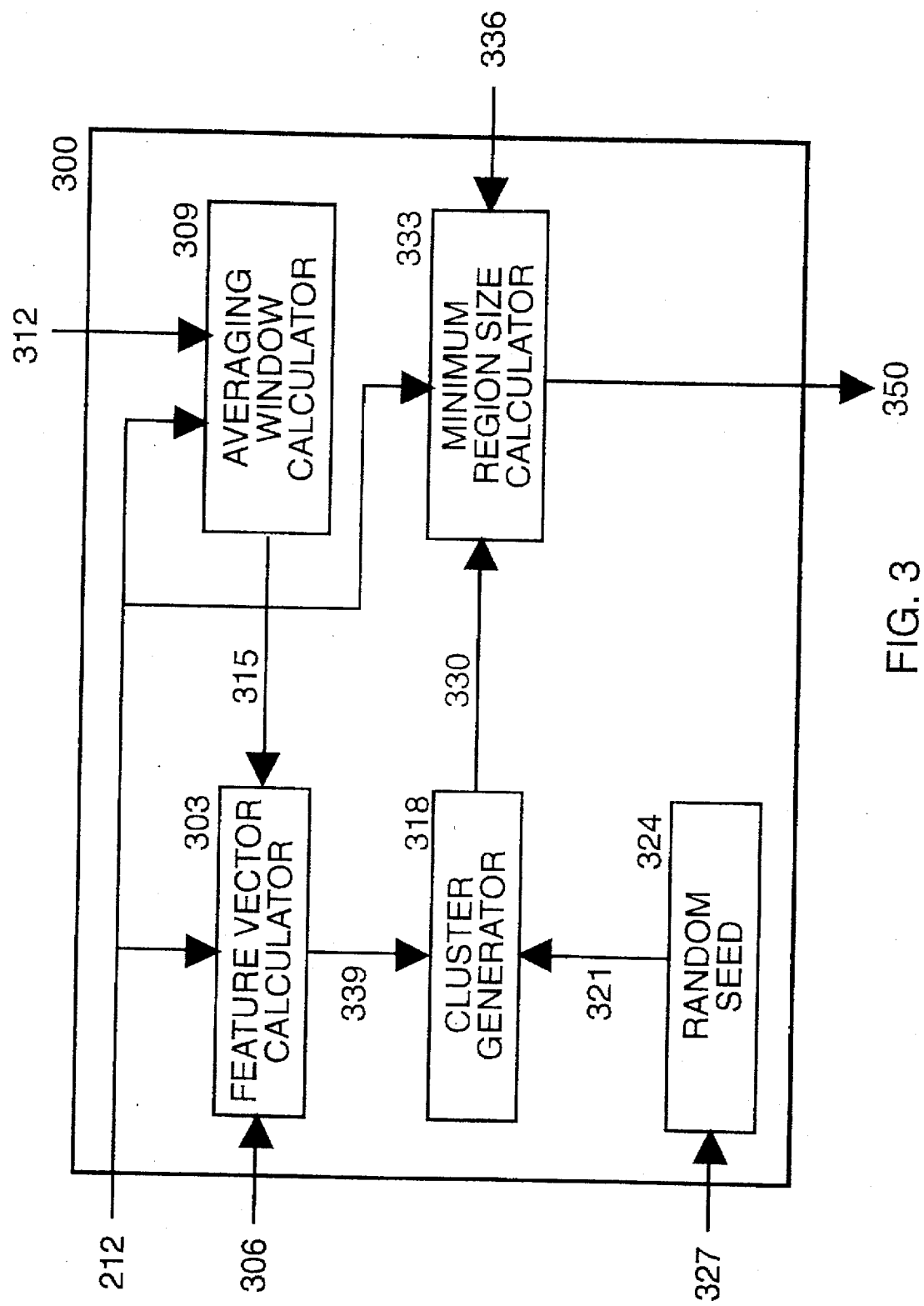
FIG. 3 is a block diagram of the range-beam partitioner.

Referring now to FIG. 3, one embodiment of range-bearing partitioner 300 is provided. Conditioned input signal 212 is provided to feature vector calculator 303 and averaging window calculator 309. Simultaneously, the user specifies the local mask sizes and averaging window sizes on local mask input 306 and window size input 312 respectively. Averaging window calculator 309 generates averaging windows, as disclosed in step 109, based on the two inputs and passes these windows as averaging window data 315 to feature vector calculator 303 which calculates the complete feature vector information. This component implements the logic of steps 103, 106, and 112.

The user determines if the device should use random cluster means. If not, the user provides the first set of random cluster means as initial cluster input 327 to random seed 324. If initial cluster input 327 is provided, then it is passed unchanged through random seed 324 and through initial cluster data 321 to cluster generator 318. If no initial cluster input 327 is provided, then random seed 324 randomly determines initial cluster data 321 and passes it to cluster generator 318.

Cluster generator 318 takes initial cluster data 321 and combines it with feature vector data 339 iteratively, as provided in step 115, to provide a complete set of cluster information as full cluster data 330. Full cluster data 330 and conditioned input signal 312 are combined and processed by minimum region size calculator 333. Minimum region size calculator 333 takes minimum region size input 336 from the user and then partitions conditioned input signal 212 into a number of distinct homogeneous partitions as defined in step 118. The result is enhanced partition input signal 350 which is the final output of range-bearing partitioner 300.

Although the electronics of the range-bearing partitioner have been disclosed as distinct components with separate input and output lines, several alternative methods of implementation are also comprehended by the present invention, including, but not limited to: implementation through shared memory to hold data rather than individual signal lines with hardware implemented logic circuits; and implementation of logic through software on generic computational processors using conventional shared resources to hold data.

Through the use of the present invention, the complete active sonar system is enhanced such that the data passed to the two-dimensional adaptive filter is partitioned into homogeneous regions. This allows the estimate of co-variance matrices by the adaptive filter to be made much more accurately. Additionally, because the user can select the degree of computational complexity which the method entails, the method can be tailored to provide very fast initial estimates, particularly of cluster means. Alternatively, a large degree of resolution can be specified if the user desires.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method for enhancing active sonar input signals comprising the steps of:

generating a reference set of non-redundant difference vectors for the input signal;

computing a set of feature vectors for each resolution cell;

partitioning the feature vectors into distinct clusters; and reclassifying the feature vectors into minimally sized homogeneous regions.

2. A method for enhancing active sonar signals as in claim 1 wherein said step of generating a reference set of non-redundant difference vectors further comprises the steps of:

specifying the quantity of lag vectors (mxn) included in the difference set calculation; and computing the set of lag vectors $(d_1, d_2)$ where $d_1$ and $d_2$ are selected such that $d_1=0 \ldots m-1$ and $d_2=0$ or $d_1=1-m \ldots m-1$ and $d_2=1 \ldots n-1$.

3. A method for enhancing active sonar signals as in claim 1 wherein said step of computing a set of feature vectors for each resolution cell further comprises the steps of:

computing an averaging window for each resolution cell;

selecting the non-redundant difference vectors which fit within each resolution cell's averaging window;

summing the differences between the actual and mean values for the selected difference vectors; and inserting a final, weighted point into the feature vector.

4. A method for enhancing active sonar signals as in claim 1 wherein said step of partitioning the feature vectors into distinct clusters further comprises the steps of:

assigning an initial mean cluster value for each cluster;

assigning each feature vector to a cluster; and recomputing the value of each cluster's mean cluster value based on the results of said step of assigning each feature vector.

5. A method for enhancing active sonar signals as in claim 4 wherein said step of assigning an initial mean cluster value for each cluster comprises assigning an initial set of user determined values to mean cluster values.

6. A method for enhancing active sonar signals as in claim 4 wherein said step of assigning an initial mean cluster value for each cluster comprises assigning a random value in the range of the feature vector values to each mean cluster value.

7. A method for enhancing active sonar signals as in claim 4 wherein said steps of assigning each feature vector to a cluster and recomputing the value of each cluster's mean cluster value are repeated a plurality of times.

8. A method for enhancing active sonar signals as in claim 4 wherein said step of recomputing the value of each cluster's mean cluster value is completed by computing the average value of all feature vectors currently assigned to the cluster.

9. A method for enhancing active sonar signals as in claim 4 wherein said step of assigning each feature vector to a cluster is completed by assigning each feature vector to the cluster which has the mean cluster value closest to the value of the feature vector.

10. A method for enhancing active sonar signals as in claim 1 wherein said step of reclassifying the feature vectors into minimally sized homogeneous regions further comprises the steps of:

dividing the complete input signal into mxn blocks;

determining the cluster which contains the most cells within each block; and reclassifying all cells within each block to the cluster determined.

11. An enhanced active sonar detector comprising:

a sonar receiving array;

a beamformer electronically connected to said sonar receiving array;

one or more prefilters electronically connected to said beamformer;

a range-bearing partitioner electronically connected to said prefilters; and a two-dimensional adaptive filter electronically connected to said partitioner.

12. An enhanced active sonar detector as in claim 11 wherein said range-bearing partitioner further comprises:

an input signal connected to said prefilters;

a means for transferring electronic signals attached to said input signal;

a means for calculating feature vectors electronically connected to said transferring means;

a means for separating feature vectors into clusters electronically connected to said transferring means; and a means for generating minimally sized regions from said clusters attached to said transferring means.

13. An enhanced active sonar detector as in claim 12 wherein said transferring means comprises individual signal lines.

14. An enhanced active sonar detector as in claim 13 wherein said transferring means comprises a single shared resource to which all components are connected.

15. An enhanced active sonar detector as in claim 12 wherein said calculating means, said separating means, and said generating means are individual logic circuits.

16. An enhanced active sonar detector as in claim 12 wherein said calculating means, said separating means, and said generating means are generic computational processors having customized software implementing the logic of each component.

17. An enhanced active sonar detector as in claim 14 wherein said calculating means, said separating means, and said generating means are a single computational processor having shared memory and customized program segments implementing each logical component.

18. An enhanced active sonar detector as in claim 11 wherein said calculating means, said separating means, and said generating means additionally comprise inputs allowing an external user to control the parameters of their respective operations.

19. An enhanced active sonar detector as in claim 11 wherein said feature vector calculator further comprises an averaging window calculator.

20. An enhanced active sonar detector as in claim 11 wherein said cluster generator further comprises a random seed.

* * * * *